(12) United States Patent
Jackson et al.

(10) Patent No.: US 6,447,059 B1
(45) Date of Patent: Sep. 10, 2002

(54) ADJUSTABLE SEAT COVERS FOR HIGH OR LOW BACK SEATS

(75) Inventors: Stephen Jackson, Stockton; Michael Wilcox, Woodbridge, both of CA (US)

(73) Assignee: USA Products, Lodi, CA (US)

( * ) Notice: Subject to any disclaimer, the term of this patent is extended or adjusted under 35 U.S.C. 154(b) by 0 days.

(21) Appl. No.: 09/989,472

(22) Filed: Nov. 19, 2001

Related U.S. Application Data

(63) Continuation of application No. 09/631,407, filed on Aug. 3, 2000, now Pat. No. 6,345,866.

(51) Int. Cl.[7] .............................................. A47C 31/00
(52) U.S. Cl. ................. 297/228.12; 297/224; 297/229; 297/188.06
(58) Field of Search ..................... 297/218.4, 228.12, 297/229, 224, 220, 188.04, 188.05, 188.06

(56) References Cited

U.S. PATENT DOCUMENTS

| | | | | |
|---|---|---|---|---|
| 1,820,104 A | * | 8/1931 | Whaley | 297/224 |
| 4,396,227 A | * | 8/1983 | Neilson | 297/228.11 |
| 4,669,779 A | * | 6/1987 | Kaganas et al. | 297/224 |
| 4,676,549 A | * | 6/1987 | English | 297/224 |
| 4,958,886 A | * | 9/1990 | Barattini et al. | 297/224 |
| 5,005,901 A | * | 4/1991 | Hinde | 297/220 |
| 5,234,252 A | * | 8/1993 | Wallach | 297/220 |
| 5,655,813 A | * | 8/1997 | Kirkpatrick | 297/220 |
| 5,707,107 A | * | 1/1998 | Melone | 297/228.1 |

* cited by examiner

Primary Examiner—Anthony D. Barfield
(74) Attorney, Agent, or Firm—Gray Cary Ware & Freidenrich LLP

(57) ABSTRACT

An adjustable seat cover capable of fitting low-back and high-back automobile seats. The seat cover includes a back portion having upper and lower rear panels, the bottom edge of the upper rear panel extending below the top edge of the lower rear panel. A plurality of spaced-apart straps extends from the top edge of the upper rear panel and one or more straps extend from the bottom edge of the upper rear panel. The straps both secure the cover to the seat as well as providing for and maintaining a smooth, custom-fit appearance when the cover is installed on both low-back and high-back seats.

23 Claims, 3 Drawing Sheets

ADJUSTABLE SEAT COVERS FOR HIGH OR LOW BACK SEATS

This is a Continuation of Ser. No. 09/631,407 filed on Aug. 3, 2000 now U.S. Pat. No. 6,345,866.

BACKGROUND OF THE INVENTION

The present invention relates to automobile seat covers, and more particularly to automobile seat covers capable of fitting a variety of automobile seat configurations.

Automobile seats, in particular so-called bucket style or bucket-type seats, typically come in two general designs: high-back and low-back seats. Low back seats generally have a back portion terminating at or about the shoulder level of a seat occupant, whereas high-back seats, as the name implies, have back portions that extend higher than the back portions of low-back seats. It is also generally the case that the uppermost back portion of high-back seats generally narrows relative to the lower portion.

These different styles have necessarily led to the manufacture of automobile seat covers of different configurations that correspond to each style. Efforts to devise so-called universal-fit seat covers, i.e., covers that can fit both low-back and high-back seats, have employed synthetic elastic or stretchable materials. Examples of such seat covers are disclosed in, for example, U.S. Pat. No. 4,958,886. However, natural materials, and, in particular, animal hides such as sheepskin remain very popular for automobile seat covers, for both comfort and aesthetic reasons. Because sheepskin is non-elastic or non-stretchable, it has typically been necessary for manufacturers and retailers to design, manufacture and stock at least two versions of sheepskin seat covers, i.e., high-back and low-back versions. Attempts have been made to design universal seat covers where a portion of the seat cover consists of sheepskin. For example, U.S. Pat. No. 4,676,549 discloses a seat cover having a sheepskin panel and a cap portion made of a stretchable material. However, for reasons of comfort, look, and marketability, there remains a need for universal seat covers that employ sheepskin.

SUMMARY OF THE INVENTION

The present invention meets these and other needs and is directed to an automobile seat cover capable of being secured over both high-back and low-back automobile seats. In one aspect, the invention provides for an automobile seat cover having a seat portion connected to a back portion. The seat portion is formed of a surface panel and a side panel affixed thereto. The back portion is formed of a forward panel affixed to upper and lower rear panels, the bottom edge of the upper rear panel extending below the top edge of the lower rear panel. The seat cover also includes straps for securing the cover to the seat, as well as maintaining a smooth custom fit appearance when the cover is secured over both low-back and high-back seats. These straps include a plurality of first spaced-apart straps extend from the top edge of the upper rear panel, and one or more second straps extend from the bottom edge of the upper rear panel. The straps can be secured under tension to the seat frame or to other straps originating from the seat portion of the cover in order to maintain the back portion of the seat cover in place.

In an embodiment of the invention, the surface panel of the seat portion and the forward panel of the back portion are formed of an inelastic material, such as an animal hide. In a preferred embodiment, these panels are formed of sheepskin. In another embodiment of the invention, the side and rear panels are formed of an elastic material.

In yet another embodiment, a sleeve containing a drawstring is provided along the top edge of the lower rear panel. A portion of the drawstring extends through the sleeve. By pulling the extended portion and locking it in place against the sleeve, the top edge is placed into and maintained in a constricted condition.

A more complete understanding of the invention will be apparent by reference to the following drawings and description.

DETAILED DESCRIPTION OF THE INVENTION

Figure 1:
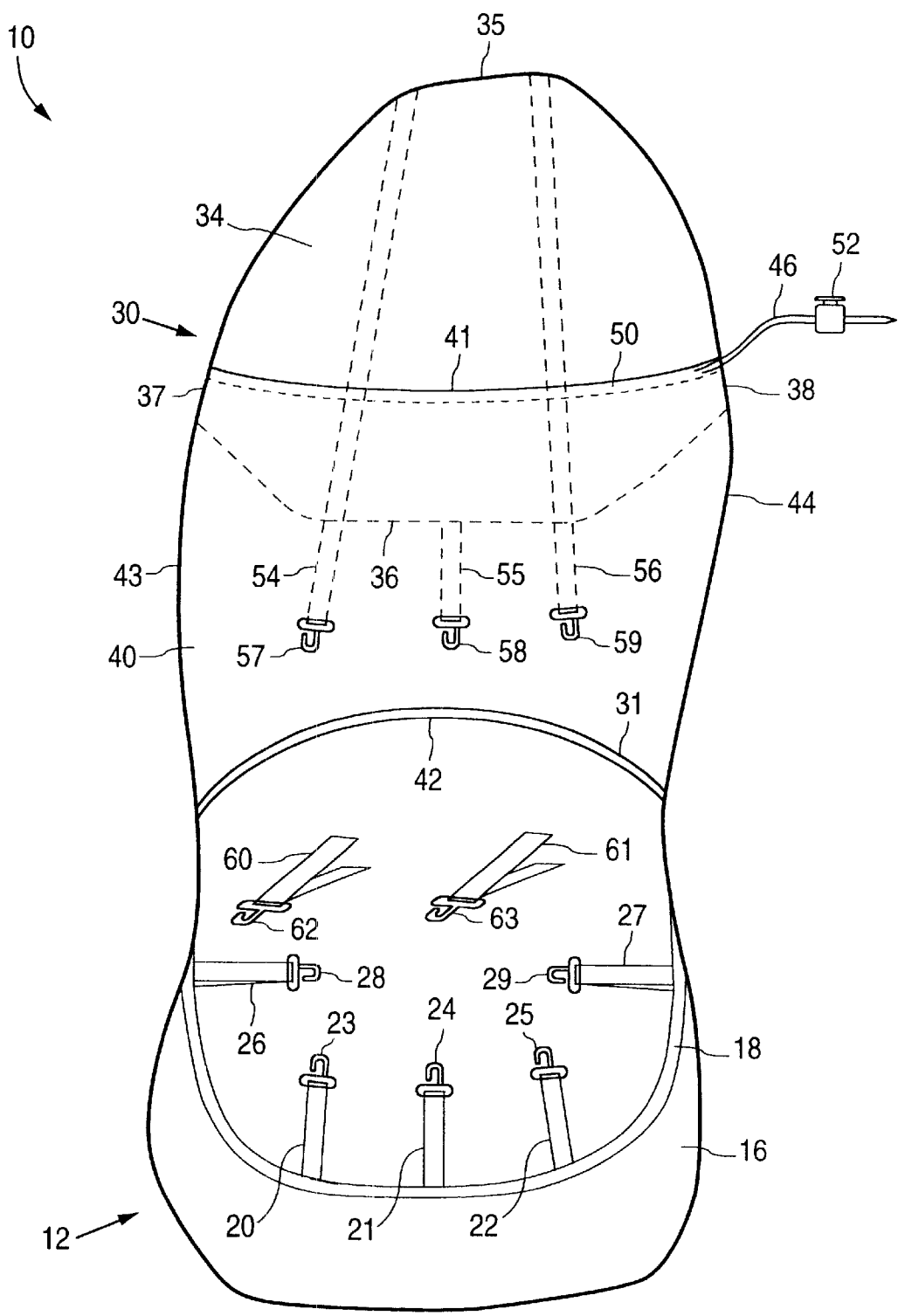
FIG. 1 is a bottom view of a seat cover according to one embodiment of the invention showing the underside of the seat cover.
Figure 2:
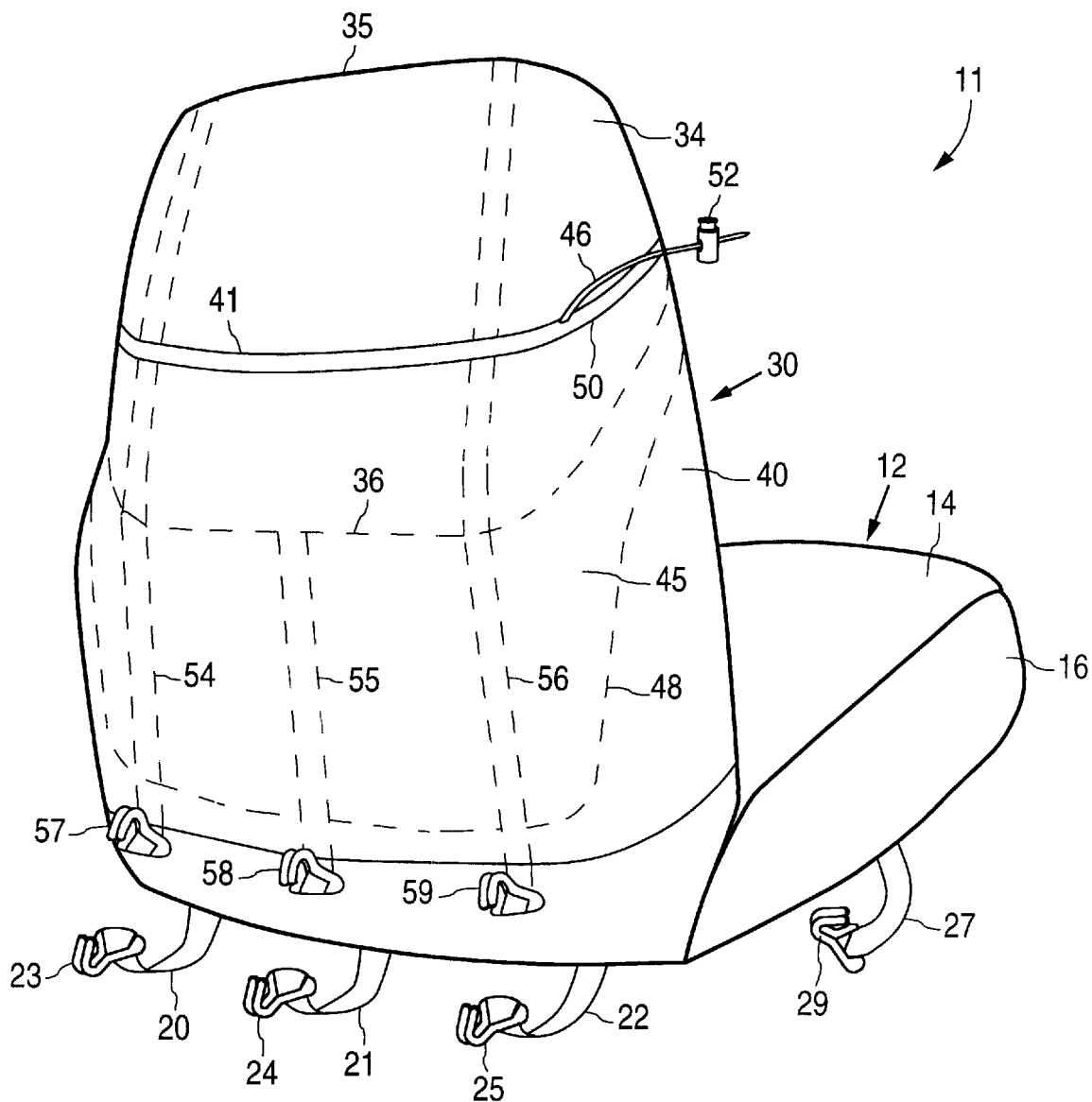
FIG. 2 is a perspective view of the seat cover of another embodiment of the invention, oriented for mounting onto an automobile seat.

Embodiments of seat covers according to the present invention are depicted in FIGS. 1 and 2, respectively. Seat covers 10 and 11, as depicted, both include seat portion 12 and back portion 30. As more clearly shown in FIG. 2, the seat portion is configured to fit over and cover the seat portion of an automobile seat (not shown), and the back portion is configured to fit over and cover the back of an automobile seat, whether it be of the high-back or low-back variety. A plurality of securing straps and hooks are provided for securing the seat cover to the seat, as will be more fully described herein.

Seat portion 12 includes surface panel 14 that is configured to generally correspond to and cover the seat surface of an automobile seat. Side panel 16 is affixed to the front and side edges of upper surface panel 14 and extends downward therefrom. The side panel is thus configured to cover the front and side faces of an automobile seat. The bottom edge of side panel 16 is rimmed with elastic hem 18. The hem serves to gather the bottom portions of the side panel under the seat itself when the seat cover is installed, helping to maintain seat portion 10 in place and providing for a smoother exterior appearance. Front elastic securing straps 20, 21, and 22 having hooks 23, 24 and 25, respectively, extend from the bottom front edge of panel 16. Similarly, side elastic securing straps 26 and 27 having hooks 28 and 29, respectively, extend from either side edge of panel 16. The straps and hooks are used to more firmly secure seat portion 12 to the automobile seat by securing the straps under tension. This can be accomplished, for example, by securing the hooks to the underside frame of the automobile seat or by securing the hooks of opposing straps.

Back portion 30 includes forward panel 32 and upper and lower rear panels 34, 40. Upper real panel 34 is affixed to upper and side edges of forward panel 32 along top edge 35 and side edges 37, 38 of the upper rear panel. Lower real panel 40 is affixed to side edges of forward panel 32 along side edges 43, 44 of the lower rear panel. Lower rear panel 40 is positioned such that an upper region of the lower rear panel overlaps a lower region of upper rear panel 34. That is, bottom edge 36 of upper rear panel 34 extends below top edge 41 of lower rear panel 40. Elastic hem 31 is secured along the bottom edge 42 of lower rear panel 40 and serves to gather material at the bottom edge for a smooth appearance.

Back portion 30 is attached to seat portion 12. Specifically, the bottom edge of forward panel 32 of the back portion is affixed to the rear edge of upper surface panel 14 of the seat portion. Elastic center securing straps 60 and 61 having hooks 62 and 63, respectively, extend from the junction of forward panel 32 and surface panel 14. When the seat cover is applied to a seat, these straps can be fed through the space between the seat back and the seat itself, and then secured to the seat frame or to other straps originating from the seat cover.

Panels 14 and 32 are formed of an inelastic, non-stretchable material. Suitable inelastic materials include those woven or knit from synthetic or natural fibers, and others such as animal hides, e.g., sheepskin or leather. In a preferred embodiment of the invention, the inelastic material is a sheepskin. Panels 16, 34 and 40 can be formed of any suitable material, including synthetic and non-synthetic materials, although it is preferred that they have some elasticity. For aesthetic reasons, it is preferable that materials of panels 14 and 32, and panels 16, 34 and 40 are of a similar texture. For example, where surface and forward panels 14 and 32 are formed of sheepskin, rear panels 34 and 40 can be formed of a stretchable synthetic fur material chosen to match the sheepskin in color and texture, thereby giving a pleasing overall appearance to the cover. The panels can be affixed to each other as described above by stitching or other conventional means known in the art.

Sleeve 50 extends along top edge 41 of lower rear panel 40. Drawstring 46 extends through the sleeve, and is secured at either end at or near side edges 43, 44. A portion of the drawstring extends from the sleeve. By pulling on this extended portion of the drawstring, top edge 41 of lower rear panel 40 can be constricted. Barrel lock 52 is disposed on the extending portion and can be employed to lock the drawstring in place and maintain top edge 41 in a constricted condition.

Rear elastic securing straps 54, 55 and 56 extend along the inward facing sides of upper and lower rear panels 34 and 40, such that they are hidden from view when the seat cover is installed onto a seat. Straps 54, 55 and 56 include securing hooks 57, 58, and 59, respectively, for attachment to the seat frame or to securing hooks of opposing straps originating from seat portion 12. In particular, securing straps 54 and 56 originate at spaced-apart locations along top edge 35 of upper rear panel 34. Securing strap 55 originates from bottom edge 36 of upper rear panel 34. As detailed below, these straps in conjunction with the design of rear panels 34 and 40 operate to provide an adjustable seat cover that can fit either high-back or low-back seats.

Seat cover 11 of FIG. 2 has the added feature of storage pocket 45 formed between the overlapping portions of upper and lower rear panels 34 and 40. As depicted, pocket lining 48 extends from bottom edge 36 of upper rear panel 34 and connects to top edge 41 of lower rear panel 40 to form the storage pocket. The pocket lining can be formed of a variety of suitable materials. The configuration and depth of the pocket can be altered by changing the shape and size of the pocket lining. It will be appreciated that a storage pocket can also be created by securing the pocket lining at locations along lower rear panel 40 but below top edge 41.

To install the seat cover 10 onto either a low-back or high-back automobile seat, the seat portion 12 is placed over the seat itself and back portion 30 is fitted over the seat back. The elastic straps are used to tighten own and secure the seat cover into place on the seat. As mentioned, the straps can be hooked onto the seat frame itself or alternatively, opposing hooks can be secured to one another to create the appropriate tension on the seat cover. For example, side straps 26 and 27 can be secured to one another. Similarly, front straps 20, 21 and 22 can be secured to rear straps 54, 55 and 56, respectively.

Figure 3:
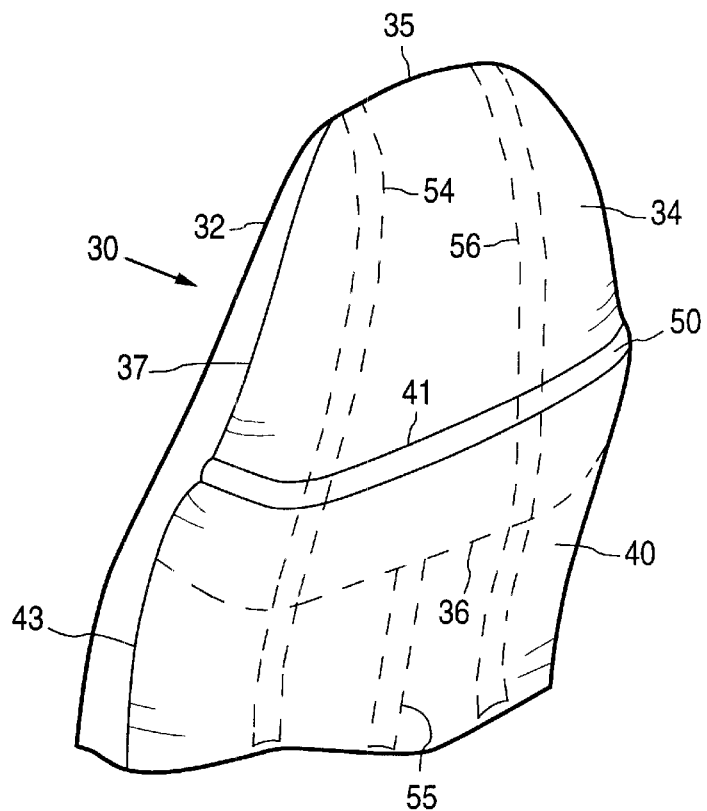
FIG. 3 is a perspective view, with parts broken away, of the seat cover of FIG. 1 mounted onto a high-back automobile seat.

As more clearly shown in FIG. 3, in the case of installation over a high-back seat, the seat back itself will essentially fill back portion 30. The elasticity of rear panels 34 and 40 provide for a snug fit and smooth appearance. By tightening drawstring 46 and securing it with barrel lock 52, the back portion can be even more tightly cinched onto the seat back. Tightening drawstring 46 also serves to close off the opening to storage pocket 45 in the embodiment of FIG. 2. The barrel lock and excess portion of the drawstring extending from sleeve 50 can be tucked behind panel 40.

Figure 4:
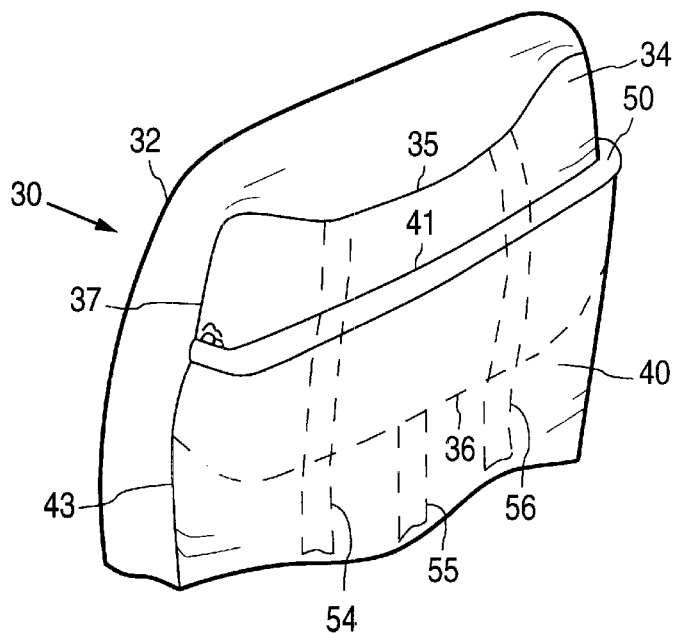
FIG. 4 is a perspective view, with parts broken away, of the seat cover of FIG. 1 mounted onto a low-back automobile seat.

FIG. 4 shows cover 10 secured over a low-back seat. As seen, securing straps 54 and 56 impart a pulling force on the top of forward panel 32. This pulling force causes the top portion of panel 32 to be drawn over the top and upper back portion of the seat itself. The result is that the forward-facing panel 32 retains a smooth-fitting appearance over the front portion of the seat back. At the same time, securing strap 55 also imparts a pulling force on upper rear panel 34. This results in a taking up of slack in rear panel 34 created when the top of forward panel 32 is drawn over the seat top by straps 54 and 56. Further, the elastic nature of panel 34 also takes up additional slack in the panel. Any additional excessive gathering or bunching of the material of panel 34 can be manually pushed behind the top region of lower panel 40. Again, by tightening drawstring 46 and securing it with barrel lock 52, the entire back portion of the cover can be even more tightly cinched onto the seat back. The end result is that cover maintains a smooth, custom-fit appearance on a low-back seat. It will be appreciated that the design can also accommodate a wide variety of seat sizes ranging between high-back and low-back styles. In any such case, the operation of the straps and the rear panels yield a smooth, custom fit appearance.

Although only certain embodiments have been illustrated and described, those having ordinary skill in the art will understand that the invention is not limited to the specifics of these embodiments, but rather is defined by the accompanying claims.

We claim:

1. An adjustable automobile seat cover capable of conforming to a high-back or low-back automobile seat, the cover comprising:

a seat portion having a surface panel and a side panel affixed to the surface panel;

a back portion having a forward panel, and upper and lower rear panels, each panel having top, bottom and side edges, the upper rear panel affixed to the forward panel along the top and side edges of each, the lower rear panel affixed to the forward panel along the side edges of each, the bottom edge of the upper rear panel extending below the top edge of the lower rear panel; and a plurality of securing straps for securing the cover to the seat, including first spaced-apart securing straps extending from the upper edge of the top rear panel, and one or more second securing straps extending from the bottom edge of the top rear panel.

2. The seat cover of claim 1 wherein said surface and forward panels are formed of an inelastic material.

3. The seat cover of claim 2 wherein said inelastic material is sheepskin.

4. The seat cover of claim 1 wherein said upper and lower rear panels are formed of an elastic material.

5. The seat cover of claim 1 further comprising means for constricting the top edge of the lower rear panel.

6. The seat cover of claim 5 wherein said constricting means comprises a drawstring.

7. The seat cover of claim 6 further comprising a sleeve affixed to the top edge of the rear panel, wherein the sleeve contains the drawstring.

8. An adjustable automobile seat cover capable of conforming to a high-back or low-back automobile seat, the cover comprising:

a seat portion having a surface panel and a side panel affixed to the surface panel;

a back portion having a forward panel, and upper and lower rear panels, each panel having top, bottom and side edges, the upper rear panel affixed to the forward panel along the top and side edges of each, the lower rear panel affixed to the forward panel along the side edges of each, the bottom edge of the upper rear panel extending below the top edge of the lower rear panel;

a plurality of securing straps for securing the cover to the seat, including first spaced-apart securing straps extending from the upper edge of the top rear panel, and one or more second securing straps extending from the bottom edge of the top rear panel; and a drawstring for constricting the upper edge of the lower rear panel, the drawstring extending through a sleeve affixed to the top edge of the lower rear panel.

9. The seat cover of claim 8, wherein said surface and forward panels are formed of an inelastic material.

10. The seat cover of claim 9 wherein said inelastic material is sheepskin.

11. The seat cover of claim 8, wherein said upper and lower rear panels are formed of an elastic material.

12. An adjustable automobile seat cover capable of conforming to a high-back or low-back automobile seat, the cover comprising:

a seat portion having a surface panel; and a back portion having a forward panel, and upper and lower rear panels, each panel having top, bottom and side edges, the upper rear panel affixed to the forward panel along the top and side edges of each, the lower rear panel affixed to the forward panel along the side edges of each, the bottom edge of the upper rear panel and a portion of the upper rear panel extend below the top edge of the lower rear panel and between the forward panel and the lower rear panel;

wherein an amount of the upper rear panel portion that is disposed below the lower rear panel top edge and between the forward and lower rear panels is adjustable to accommodate various sizes of automobile seats.

13. The seat cover of claim 12, further comprising:

a first securing strap extending from adjacent the upper edge of the top rear panel; and a second securing strap extending from adjacent the bottom edge of the top rear panel.

14. The seat cover of claim 13, further comprising:

a third securing strap extending from adjacent the upper edge of the top rear panel, wherein the first and third securing straps are spaced apart from each other.

15. The seat cover of claim 14, further comprising:

securing hooks attached to distal ends of the first and second securing straps.

16. The seat cover of claim 15, wherein the first and second securing straps are made of an elastic material.

17. The seat cover of claim 12, wherein the surface and forward panels are formed of an inelastic material.

18. The seat cover of claim 17, wherein the inelastic material is sheepskin.

19. The seat cover of claim 18, wherein the upper and lower rear panels are formed of an elastic material.

20. The seat cover of claim 12, further comprising:

means for constricting the top edge of the lower rear panel.

21. The seat cover of claim 20, wherein the constricting means comprises a drawstring.

22. The seat cover of claim 21, further comprising:

a sleeve affixed to the top edge of the rear panel, wherein the sleeve contains the drawstring.

23. The seat cover of claim 12, further comprising:

a pocket lining extending from the bottom edge of the upper rear panel to the edge of the lower rear panel for forming a pocket.

* * * * *

Disclaimer 6,447,059 B1 — Stephen Jackson, Stockton, CA (US); Michael Wilcox, Woodbridge, CA (US). ADJUSTABLE SEAT COVERS FOR HIGH OR LOW BACK SEATS. Patent dated September 10, 2002. Disclaimer filed December 9, 2002, by the assignee, USA Products.

The term of this patent shall not extend beyond the expiration date of Patent No. 6,345,866.

*(Official Gazette October 14, 2008)*

(12) EX PARTE REEXAMINATION CERTIFICATE (5369th)
United States Patent
Jackson et al.

(10) Number: US 6,447,059 C1
(45) Certificate Issued: May 9, 2006

(54) ADJUSTABLE SEAT COVERS FOR HIGH OR LOW BACK SEATS

(75) Inventors: Stephen Jackson, Stockton, CA (US); Michael Wilcox, Woodbridge, CA (US)

(73) Assignee: USA Products, Lodi, CA (US)

Reexamination Request:
No. 90/006,765, Aug. 29, 2003

Reexamination Certificate for:
Patent No.: 6,447,059
Issued: Sep. 10, 2002
Appl. No.: 09/989,472
Filed: Nov. 19, 2001

Related U.S. Application Data

(63) Continuation of application No. 09/631,407, filed on Aug. 3, 2000, now Pat. No. 6,345,866.

(51) Int. Cl.
*A47C 31/00* (2006.01)

(52) U.S. Cl. ............... 297/228.12; 297/224; 297/229; 297/188.06

(58) Field of Classification Search ............ 297/228.12, 297/224, 229, 188.06, 218.4, 220, 188.05, 297/188.04
See application file for complete search history.

(56) References Cited

U.S. PATENT DOCUMENTS

| | | | |
|---|---|---|---|
| 1,861,455 A | 6/1932 | Schwartz | |
| 2,223,532 A | 12/1940 | Sallop | |
| 4,396,227 A | 8/1983 | Neilson | 297/219 |
| 4,669,779 A | 6/1987 | Kaganas | 297/229 |
| 4,676,549 A | 6/1987 | English | 297/224 |
| 5,234,252 A | 8/1993 | Wallach | 297/229 |
| 5,655,813 A | 8/1997 | Kirkpatrick | 297/220 |
| 6,450,571 B1 | 9/2002 | Canni et al. | 297/188.04 |

FOREIGN PATENT DOCUMENTS

| | | |
|---|---|---|
| FR | 2725945 B1 | 10/1994 |
| FR | 727333 B1 | 8/1996 |
| GB | 1360911 B1 | 7/1974 |
| GB | 1433982 B1 | 2/1976 |
| GB | 2297032 B1 | 7/1996 |

*Primary Examiner*—Milton Nelson, Jr.

(57) ABSTRACT

An adjustable seat cover capable of fitting low-back and high-back automobile seats. The seat cover includes a back portion having upper and lower rear panels, the bottom edge of the upper rear panel extending below the top edge of the lower rear panel. A plurality of spaced-apart straps extends from the top edge of the upper rear panel and one or more straps extend from the bottom edge of the upper rear panel. The straps both secure the cover to the seat as well as providing for and maintaining a smooth, custom-fit appearance when the cover is installed on both low-back and high-back seats.

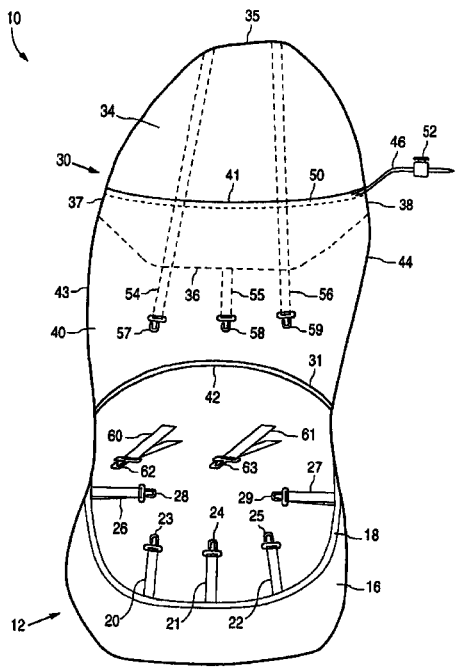

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–22 is confirmed.

Claim 23 is determined to be patentable as amended.

23. [The] *An adjustable automobile* seat cover [of claim 12, further] *capable of conforming to a high-back or low-back automobile seat, the cover* comprising:

*a seat portion having a surface panel;*

*a back portion having a forward panel, and upper and lower rear panels, each panel having top, bottom and side edges, the upper rear panel affixed to the forward panel along the top and side edges of each, the lower rear panel affixed to the forward panel along the side edges of each, the bottom edge of the upper rear panel and a portion of the upper rear panel extend below the top edge of the lower rear panel and between the forward panel and the lower rear panel;*

*wherein an amount of the upper rear panel portion that is disposed below the lower rear panel top edge and between the forward and lower rear panels is adjustable to accomodate various sizes of automobile seats; and* a pocket lining extending from the bottom edge of the upper rear panel to the edge of the lower rear panel for forming a pocket.

\* \* \* \* \*